United States Patent [19]
van Leeuwen

[11] 3,751,845
[45] Aug. 14, 1973

[54] FISHING BUCKET

[76] Inventor: Marion van Leeuwen, 531 High St., Apt. 5, New London, Wis. 54961

[22] Filed: Apr. 23, 1971

[21] Appl. No.: 136,718

[52] U.S. Cl. .................. 43/56, 43/57 SR, 220/9 F
[51] Int. Cl. .................. A01k 97/04, A01k 97/06
[58] Field of Search .................. 43/4, 55, 56, 54.5, 43/57.5 R; 119/3; 209/9 F, 85 R

[56] References Cited
UNITED STATES PATENTS

| | | |
|---|---|---|
| 1,587,785 | 6/1926 | Marsh et al. ........................ 43/56 |
| 3,603,019 | 9/1971 | Smeltzer ........................ 43/56 X |
| 181,844 | 9/1876 | Hitchcock ........................ 43/56 |
| 1,934,815 | 11/1933 | Parrott ........................ 43/56 |
| 2,912,785 | 11/1959 | Nudell ........................ 43/56 |
| 3,499,244 | 3/1970 | Malone ........................ 43/56 |
| 2,870,932 | 1/1959 | Davis ........................ 43/56 X |
| 3,000,132 | 9/1961 | Koistinen ........................ 43/56 |
| 3,236,001 | 2/1966 | Keiter ........................ 43/55 |

Primary Examiner—Louis G. Mancene
Assistant Examiner—James H. Czerwonky
Attorney—Shoemaker & Mattare

[57] ABSTRACT

A compact and easily transportable fishing bucket or the like with a combined closure and rotatable seat means thereon centrally mounted, and means for containing and making readily accessible, food and beverages or the like, live and artificial baits, tackle, and auxiliary devices. The fishing bucket includes rotatably mounted closure means providing access to its contents while the person is seated on the seat means. Antifriction means are operatively associated with the seat and engage between the seat and the closure to enable the seat to be readily rotated relative to the closure and the bucket.

24 Claims, 8 Drawing Figures

PATENTED AUG 14 1973
3,751,845
SHEET 1 OF 4
FIG. 2.
FIG. 1.
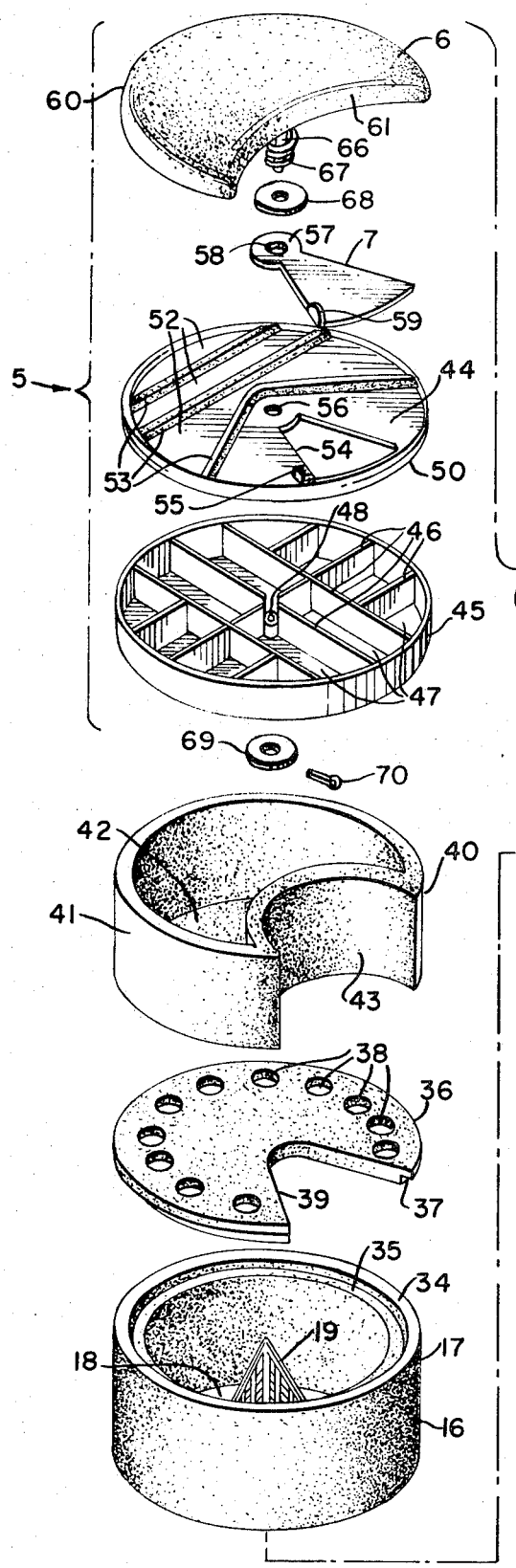
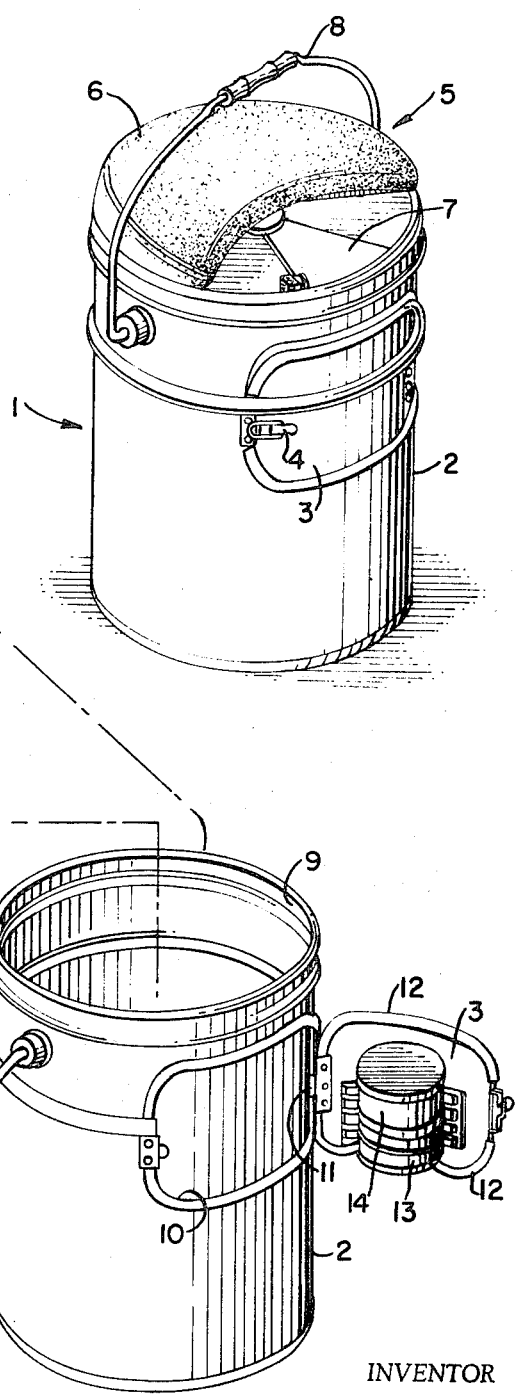
INVENTOR
MARION VAN LEEUWEN
BY *Shoemaker and Mattare*
ATTORNEYS

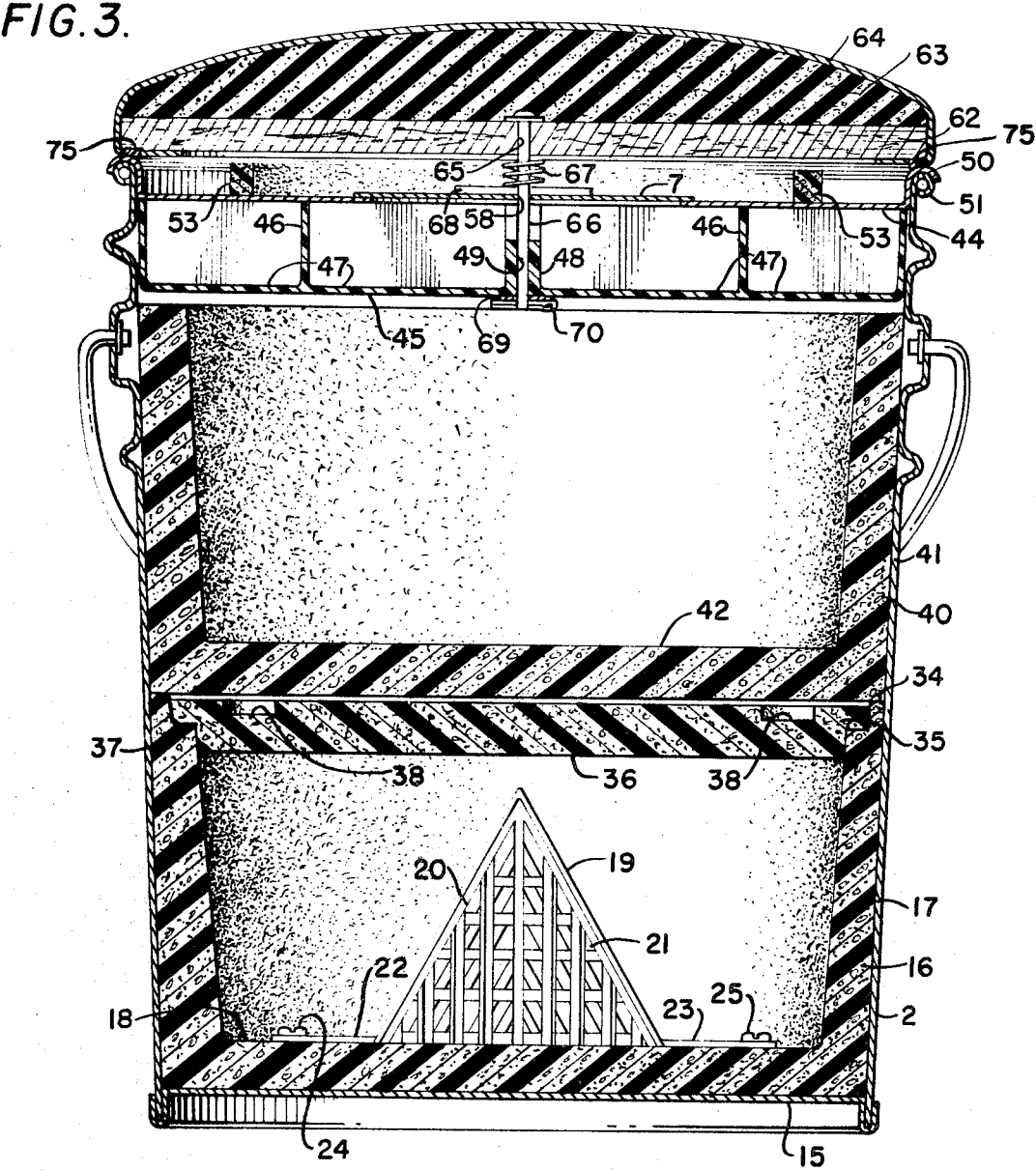
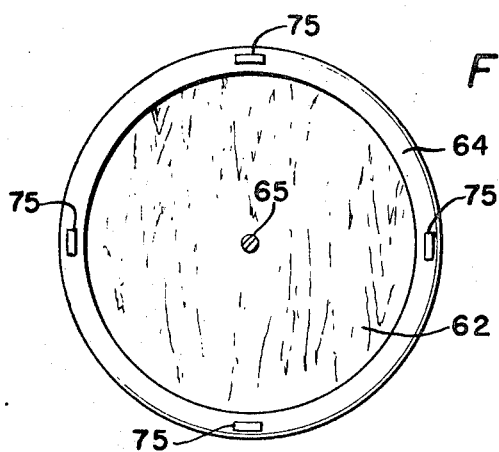

INVENTOR
MARION VAN LEEUWEN

BY Shoemaker and Mattare
ATTORNEYS

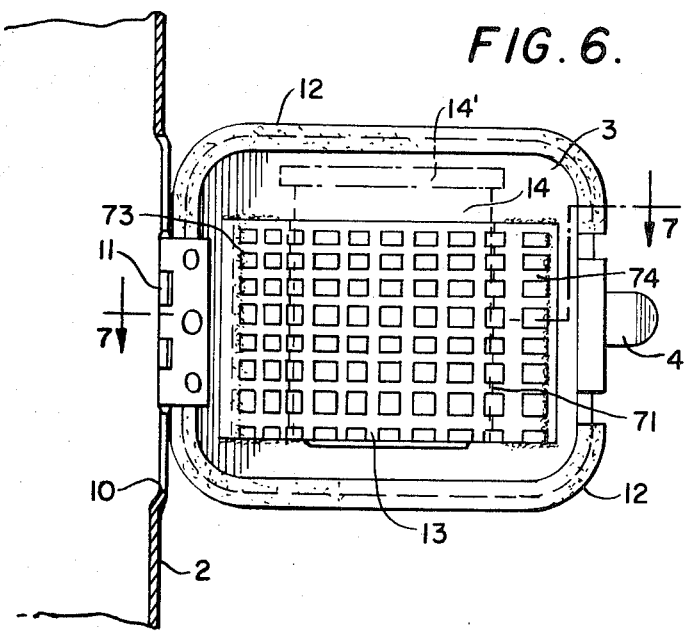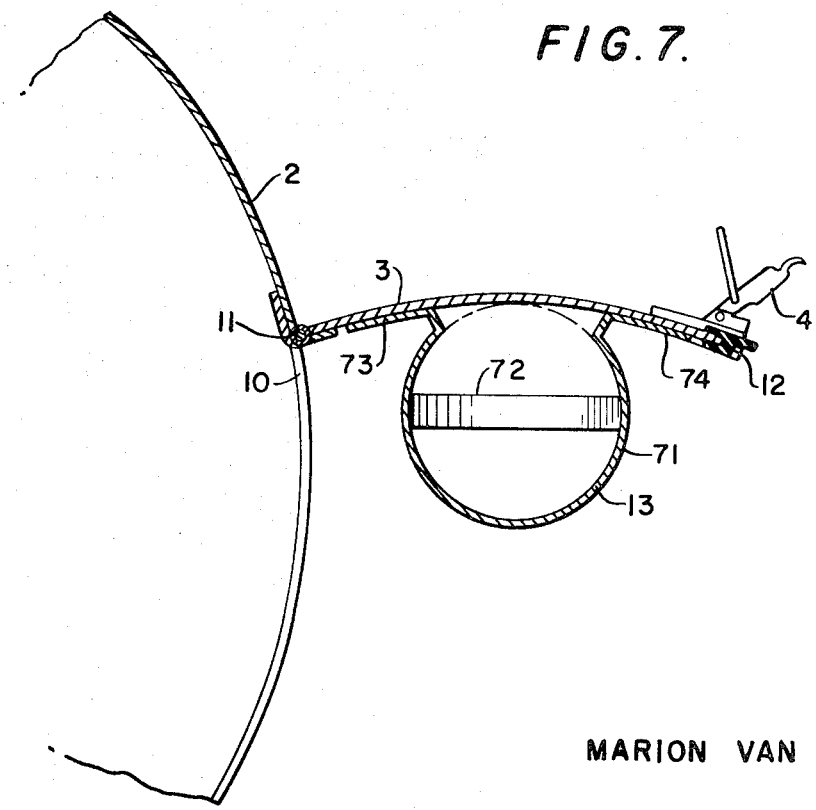

3,751,845

FISHING BUCKET

BACKGROUND OF THE INVENTION

This invention relates to a means for carrying and containing in a fishing bucket live and artificial bait, tackle, food and beverages and the like for fishermen or the like, and wherein said means further includes a combined closure and rotatable seat means.

More particularly, this invention relates to a compact and easily transportable fishing bucket for fishermen or the like, said fishing bucket including means for holding live and artificial baits, tackle, food and beverages or the like and having a combined closure and rotatable seat means thereon upon which the fisherman or the like sits. The fishing bucket includes means for making the live and artificial baits and tackle readily accessible while the fisherman or the like is seated on the seat means.

With the present invention, the fisherman is enabled to carry everything he will need for fishing in a single, easy to carry fishing bucket, such as, for example, food and beverages, live and artificial bait, tackle and other equipment, and seat means on which to sit.

OBJECTS OF THE INVENTION

An object of this invention is to provide a fishing bucket having combined closure means and rotatable seat means thereon and having means for containing live and artificial baits, tackle, food and beverages, or other equipment and devices.

A further object of this invention is to provide a fishing bucket having seat means thereon and having means for containing live and artificial baits, tackle, and food and beverages or the like and having means for providing ready access to the live and artificial baits and tackle while the fisherman is sitting on the seat means.

An even further object of this invention is to provide a fishing bucket having a combined closure and rotatable seat means.

A still further object is to provide a fishing bucket having combined closure and seat means thereon, said combined closure and seat means having means for containing fishing equipment or the like therein.

BRIEF DESCRIPTION OF THE DRAWINGS

FIG. 1 is a top perspective view of the fishing bucket according to the present invention.

FIG. 2 is an exploded perspective view of the fishing bucket shown in FIG. 1.

FIG. 3 is a sectional view in elevation of the fishing bucket shown in FIG. 1.

FIG. 6 is an enlarged view, partly in section, of the access means in the fishing bucket with means for containing live bait thereon.

FIG. 7 is a top sectional view taken along line 7—7 in FIG. 6.

FIG. 8 is a bottom view of a modified seat showing bearing means thereon for aiding in rotating the seat.

DETAILED DESCRIPTION OF THE INVENTION

Figure 4:
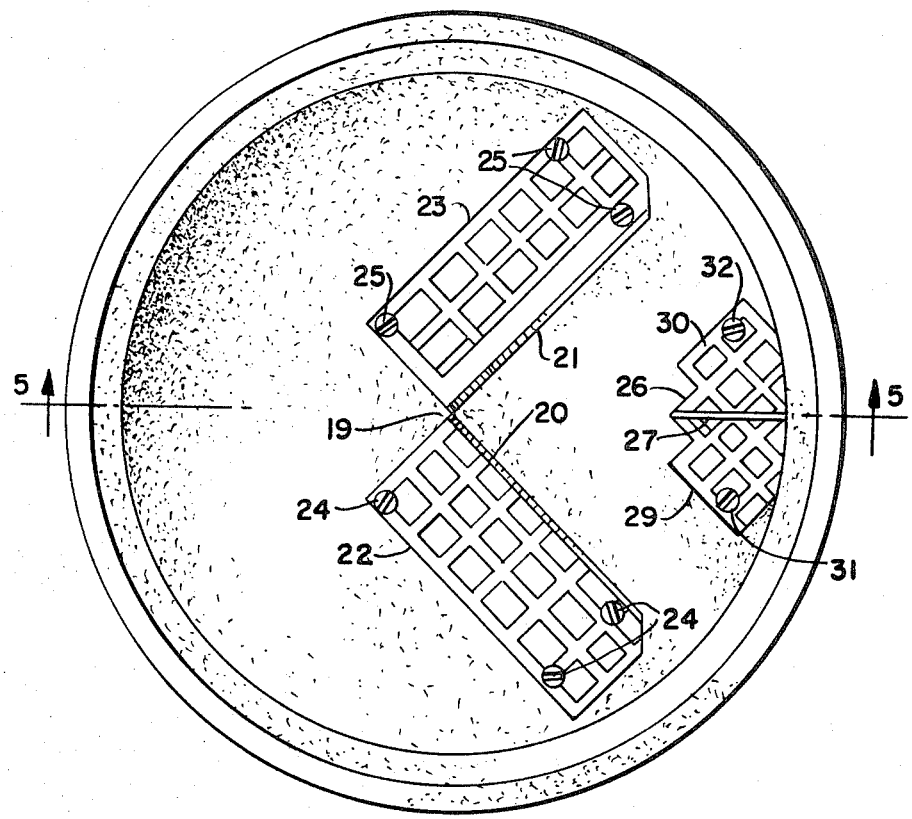
FIG. 4 is a top plan view of the minnow bucket and minnow trap.
Figure 5:
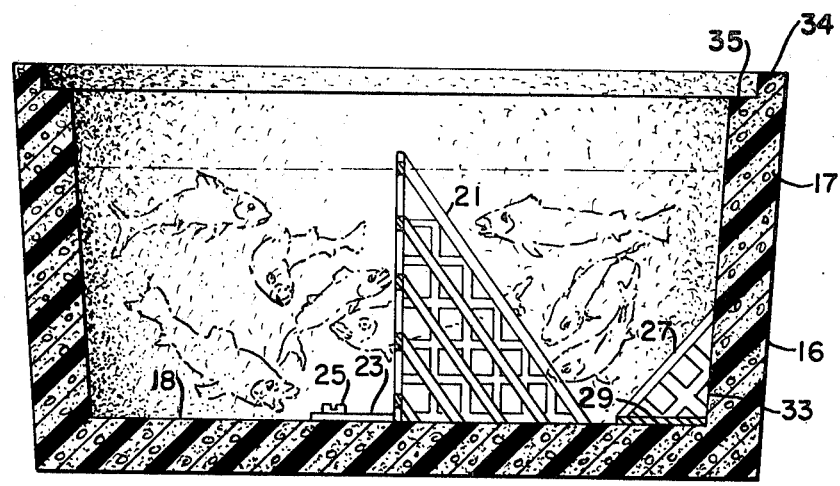
FIG. 5 is a sectional view in elevation of the minnow bucket taken along line 5—5 in FIG. 4.

Referring now to the drawings, wherein like reference numerals refer to like parts throughout the several views, a fishing bucket is indicated generally at 1 in FIG. 1 and comprises a container or bucket 2 made of steel or other suitable material and having an access door 3 in one side thereof opening to the interior of the bucket with suitable latch means 4 thereon for maintaining the access door in closed position. A combined closure and seat means 5 is positioned on the top of the bucket 2 and includes a rotatable seat means 6 and sliding access door 7 thereon. A suitable handle 8 is connected to the bucket 2 for carrying the bucket.

In FIG. 2, the bucket 2 is shown with the door 3 open and with the contents thereof removed and exploded and shown in the order in which they are received in the bucket. The bucket 2 includes an open upper end 9 and an opening 10 through one side thereof spaced downwardly from the open upper end. The access door 3 is pivotally connected to the bucket at one side of the opening 10 by suitable means such as hinge 11 or the like and has a suitable resilient seal means 12 about the peripheral edge thereof for sealing the access door 3 in the opening 10 when it is closed over the opening. A suitable bracket support means 13 is suitably connected to the inner surface of the access door 3 as by means of welding or rivets or the like for holding a small container 14 for live bait such as worms or crickets or the like.

Referring also to FIG. 3, a bottom 15 is provided in the bottom of the bucket 2 and is secured therein in a well-known manner. A substantially dish or cup-shaped minnow bucket 16 having slightly downwardly tapered side wall 17 shaped to conform to the shape of the wall of bucket 2 and a bottom wall 18 is disposed on the bottom 15 in the bucket 2 for containing minnows, crawfish or other live baits, as desired.

A minnow trap 19 is secured to the bottom wall 18 of minnow bucket 16 and comprises a pair of generally triangular shaped, perforate, upstanding walls 20 and 21 integrally joined along one edge at approximately 90° to one another, with the apex or joined edges of said walls 20 and 21 disposed substantially at the center of the bottom wall 18 of minnow bucket 16. Horizontally extending flanges 22 and 23 are on the bottom edges of walls 20 and 21, respectively, extending perpendicularly therefrom and secured to the bottom wall 18 of minnow bucket 16 by means of a plurality of screws or the like 24 and 25, or any other suitable means, such as plastic plugs glued in place.

A minnow stop 26, comprising an upstanding triangular perforate wall 27, is secured to the bottom wall 18 of minnow bucket 16 by means of a pair of oppositely, laterally extending flanges 29 and 30 having a plurality of screws 31 and 32 extended therethrough into the bottom wall 18, with one edge 33 of wall 27 disposed against side wall 17 of minnow bucket 16, said side wall 27 being positioned on a line bisecting the angle between the walls 20 and 21 of minnow trap 19.

Side wall 17 includes a portion 34 at the upper marginal edge thereof of reduced thickness defining a shoulder 35 at the inner marginal edge thereof. A rotatable minnow bucket lid 36 having a peripheral undercut portion 37 in the bottom marginal edge thereof and a plurality of circumferentially extending, relatively shallow finger grip recesses 38 in the upper surface thereof is positioned over the top of the minnow bucket 16, with the undercut portion 37 disposed in complementary relationship on shoulder 35 in the upper marginal edge of the minnow bucket. The portion 34 of reduced thickness on side wall 17 of the minnow bucket extends upwardly beyond the plane of the top surface of the lid 36. A cut out portion 39 is formed in one edge of lid 36 and extends from adjacent the center thereof through the peripheral edge and subtends an angle of approximately 45° for providing an access opening into the minnow bucket when the lid is positioned thereon.

A generally crescent shaped container 40 for containing food or beverages or the like and having a slightly inwardly tapered cylindrical side wall 41 and a bottom wall 42 is positioned within the fishing bucket 2 on top of the minnow bucket 16 with a peripheral portion of the bottom wall 42 of the container 40 resting on the portion 34 of reduced thickness on the side wall 17 of the minnow bucket 16, and with the bottom 42 spaced slightly upwardly from the top surface of the lid 36.

The crescent shaped container 40 has an inwardly curved portion 43 in one side thereof, extending over approximately one-fourth of the circumference of the container. The inwardly curved portion 43 defines an opening or access means past said one side of the container 40 in substantial alignment with the cut out portion 39 in lid 36 of the minnow bucket 16 so that with access door 3 open, the fisherman or the like may extend his hand through opening 10 in the fishing bucket 2, through the opening 43 in container 40 and cut out portion 39 in minnow bucket lid 36 into the interior of the minnow bucket 16 for grasping minnows or crawfish or the like contained therewithin while all of the contents of the fishing bucket are received within the fishing bucket 2 and the fisherman is seated on the seat 6.

The combined closure and seat means 5 is positioned within and closes the open upper end 9 of fishing bucket 2, and includes seat 6, a lid or closure 44, and a tackle tray 45. The tackle tray 45 is relatively shallow and substantially dish shaped and is preferably made of plastic or any other suitable material. A plurality of walls 46 subdivide tray 45 into a plurality of compartments 47 for containing various items of tackle such as hooks, sinkers and the like therein. A relatively short, centrally disposed, axially extending hub or boss 48 with an opening 49 is formed in the center of tackle tray 45.

The lid 44 is preferably made of steel or the like and includes a peripherally upstanding, outwardly and downwardly curved wall portion 50 shaped to be disposed over a bead 51 on the upper end of the fishing bucket 2 for supporting the combined closure and seat on the upper end of the fishing bucket. The upper surface of the lid 44 is subdivided into a plurality of compartments 52 by means of a plurality of divider means 53 preferably made of a resilient material such as urethane foam or the like and secured to the upper surface of lid 44 by means of a suitable adhesive or the like. A generally pie shaped opening 54 is formed in one side of the lid 44 and extends from adjacent the peripheral edge thereof to adjacent the center thereof. A suitable stop means 55 is secured to the lid 44 adjacent one edge of opening 54 for limiting the extent of movement of sliding closure 7 relative to opening 54 in lid 44. The stop means 55 may comprise, for example, a relatively small block of resilient material similar to the foam material from which dividers 52 are made and secured to lid 44 as by means of a suitable adhesive or the like. An opening 56 is formed through the center of lid 44 in substantial alignment with opening 49 through boss 48 in the tray 44.

The sliding closure 7 is a generally pie shaped segment having an enlarged circular flange 57 at the inner end thereof with an opening 58 through the center of the flange 57, and an upstanding, finger grip flange 59 adjacent one corner of the closure 7 at the outer marginal edge thereof for grasping with the fingers to manipulate the sliding closure 7 to open and close opening 54.

Seat 6 is generally crescent shaped in its preferred form and is preferably thicker adjacent its convex side or edge 60 than at its concave side or edge 61. As best seen in FIG. 3, the seat comprises a base or frame 62 formed of a suitable rigid material such as plywood or the like and has a resilient cushioning material 63 disposed thereover with a suitable fabric or plastic material 64 or the like secured about its edge around the edge of base or frame 62 and over the resilient material 63. An opening 65 is formed through base 62 in substantial alignment with opening 58 in closure 7 and opening 56 in lid 44.

An elongate pin or bolt 66 extends at one end through opening 65 in the base means 62 and is suitably connected therewith. The pin 66 extends downwardly from the base 62 through a coil compression spring 67, a washer 68, through opening 58 in closure 7, through opening 56 in lid 44, through opening 49 in boss 48 in tackle tray 45 and through a washer 69 under the tackle tray 45. A suitable fastening means such as a cotter pin 70 or the like is connected to the lower end of pin 66 to hold the combined seat and closure means in assembled relationship. The seat 6 is suitably rotatably mounted relative to the lid 44 for positioning the concave edge 61 thereof adjacent a desired one of the compartments 52 for selecting lead line or the like therefrom. Moreover, the concave edge 61 of the seat 6 may be positioned in alignment with the sliding closure 7 and opening 54 whereby the closure 7 may be moved sideways away from the opening 54 to give access to one or the other of compartments 47 in tackle tray 45. In order that different ones of the compartments 47 may be brought into registry with the opening 54, the tackle tray 45 is rotatably supported from lid 44 and may be rotated about the pin 66 by pushing against the walls 46, for example. The entire closure and seat assembly may be lifted from the open end of the bucket 2 to give access to the contents of the bucket through the open end thereof. As seen in FIG. 3, the bottom of tackle tray 45 is spaced upwardly from the top of container 40.

Referring to FIGS. 6 and 7, further details of the access door 3 and holder 13 are seen. The bracket or holder 13 may be made of a mesh-like perforate material, as shown, or it may be made of any other suitable material, as desired, and includes a substantially cylindrical portion 71 with a diametrically extending support strap or bar 72 extending across the bottom end thereof for supporting container 14 within the bracket or holder 13. A pair of oppositely outwardly extending connecting flanges 73 and 74 are formed on opposite sides of the cylindrical portion 71 and may be made integrally therewith or separate, as desired. The flanges 73 and 74 are suitably connected to the access door 3 as by rivets or welding or the like. If desired, the bottom support strap or bar 72 may be omitted and the container 14 may be provided with a shoulder means or the like (not shown) adapted to be supported by the upper edge of cylindrical part 71 of the bracket or holder 13.

As seen in FIGS. 3 and 8, suitable antifriction means or bearing means, such as four equally spaced nylon strips 75 or the like are interposed between the seat and closure or lid, and as shown, are suitably secured to the underside of base 62 and are positioned to ride upon bead 50 of lid 44 to reduce friction therebetween.

The seat assembly 5, container 40 and minnow bucket 16 are removable from the open end of the bucket 2 and minnows or crawfish or the like and water may be placed in the minnow bucket 16. The minnow bucket is then placed in bucket 2 and lid 36 is then positioned over the top of the minnow bucket 16 and the container 40 is positioned over the upper end of the minnow bucket. Food or beverages or the like may be placed in the container 40, and the seat assembly 5 is then positioned over the upper end 9 of the fishing bucket 2. Suitable fishing tackle such as hooks, sinkers or the like may be placed within the compartments 47 of tackle tray 45 and suitable leader or the like may be placed within the various compartments 52 of lid 44. Leader for the fishing line is selected by rotating the seat 6 relative to the lid 44 until a desired compartment 52 appears. After the leader or the like is selected the seat is rotated back to its normal front position as seen in FIG. 1, and the slide closure 7 is opened for exposing one of the compartments 47 for selection of a hook or sinker or the like from the tackle tray 45. The tackle tray may be rotated to bring a desired compartment 47 into registery with opening 54 by pushing against one of the walls 46, for example, with the finger extended through the opening 54 in the fishing bucket lid 44. Bait may be selected by opening the access door 3, and if a minnow or crawfish or the like is desired, the minnow bucket lid 36 is rotated by using the finger grips 38 and turning the lid 36 until the opening 39 is in registery with opening 10 and cut out portion 43 of container 40. While remaining seated, the entire fishing bucket is tilted forwardly and held in that position momentarily. The minnows or crawfish and the like and water are thus caused to flow forwardly in the minnow bucket 16. Then, by tilting the fishing bucket backwards, the minnows or crawfish or the like are caught in the V-shaped minnow trap 19. By reaching through the door 10 and through the cut out portions 43 and 39, the minnows or the like can be felt and caught easily by the fingers by sliding the fingers upwardly along the outside edges of the minnow trap 19, and as the hand is drawn upwardly to the apex of the minnow trap, the minnow is easily caught. After the minnow is caught, the lid 36 may be rotated back to its closed position and the fishing bucket returned to its normal seated position.

The minnow stop 26 assists in catching the minnows by stopping the minnows in front of the minnow trap 19 and is primarily used when the fisherman is not sitting on the fishing bucket. If the minnow stop 26 is used, the fishing bucket is tilted forwardly and the minnow stop causes the minnows to gather at this point, and the fingers of the hand are slipped or moved upwardly along opposite sides of the wall 27 to feel and grasp a minnow and draw it up the side of the minnow bucket to the door opening 10. After the minnow is selected, the minnow bucket lid can be returned to its closed position for insulation by pushing the side of the lid horizontally until a finger grip 38 appears, after which the lid can be completely closed by the use of the finger grips.

If a worm or the like is desired, the worm may be taken from the container 14 in its normal position in the holder 13 by merely removing lid 14' from the container 14, or the container may be removed from the holder by sliding it upward and out of the holder.

A beverage or lunch or the like may be obtained by getting off the seat 6 and lifting up the seat assembly 5 to expose the interior of the container 40.

The seat assembly 5 cannot fall off the fishing bucket when the carrying handle 8 is in carrying position.

If desired, ice can be added to both the container 40 and to the minnow bucket 16. Moreover, aereating tablets may be placed in the minnow bucket to provide additional air for the minnows or the like contained therewithin.

Preferably, the minnow bucket 16, minnow bucket lid 36 and container 40 are made of a light weight, insulating material such as styrofoam or the like, although other suitable materials may be used. The tackle tray 45 is preferably made of plastic, although other materials may obviously be used; and the lid 44 and fishing bucket 2 are preferably made of steel or the like, although they too may comprise other suitable materials.

While a specific number and arrangement of compartments or containers have been illustrated and described in the bucket 2, the containers 16 and 40, for example, could be made smaller in height and further or additional containers could be placed in stacked relationship in the bucket 2, or any other arrangement of containers could be placed in the bucket.

Further, either of the closures 7 and 3 may be hinged or slidable, as desired, and the bait container 14 could be fixed to the food compartment 40 rather than to the closure 3, if desired.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, and therefore intended to be embraced by those claims.

I claim:

1. A fishing bucket having a closed end, an open end, and a central axis, a combined rotatable seat and closure unit mounted on and closing the open end of the bucket, means on said closure unit engaged with a peripheral portion of said open end of said bucket to maintain the closure unit and seat in centered position on the bucket, means centrally of the seat and closure unit rotatably connecting the seat with the closure, and anti-friction means operatively associated with the seat and engaged between the seat and closure unit to enable the seat to be readily rotated relative to the closure unit and bucket about the central axis of the bucket.

2. A fishing bucket as in claim 1, wherein said anti-friction means comprises a plurality of antifriction means carried by said seat about the peripheral edge thereof on the underside thereof, said anti-friction means slidably supported on an upper marginal edge portion of said closure unit.

3. A fishing bucket as in claim 2, whrein said anti-friction means comprises a plurality of substantially equally spaced apart relatively short nylon strips secured to the marginal underside of said seat.

4. A fishing bucket as in claim 1, wherein said bucket is compartmentalized for containing a plurality of different fishing accessories and other objects therein.

5. A fishing bucket as in claim 4, wherein said compartments are separate from one another and include compartment means for containing fishing tackle, live and artificial baits, food and beverages or the like, and auxiliary equipment.

6. A fishing bucket as in claim 5, wherein said separate compartments are superimposed one upon the other in said fishing bucket.

7. A fishing bucket as in claim 6, wherein said combined seat and closure unit includes compartment means for containing fishing equipment.

8. A fishing bucket as in claim 7, wherein said compartment in said combined seat and closure unit is supported on said means centrally of said seat and is rotatably suspended thereby beneath said seat for rotation relative to said closure.

9. A fishing bucket as in claim 8, wherein said fishing bucket includes means providing access to the contents of the fishing bucket while a person is seated on the seat means.

10. A fishing bucket as in claim 9, wherein said access means includes an access opening and closure therefor in the side of said fishing bucket.

11. A fishing bucket as in claim 10, wherein said combined seat and closure includes a lid means, and said access means further includes an opening and closure therefor in said lid means for providing access to the compartment rotatably suspended beneath the combined seat and closure unit.

12. A fishing bucket as in claim 11, wherein said closure in the side of said bucket is pivotally connected to said bucket, and wherein said closure for closing the opening in said lid means is slidably mounted relatively thereto.

13. A fishing bucket as in claim 9, wherein said lid means includes compartment means thereon between said lid means and said seat means, said seat means being rotatably supported on top of said lid means.

14. A fishing bucket as in claim 4, wherein a substantially cup or dish-shaped compartment having a substantially cylindrical side wall, a bottom wall and an open upper end is positioned within and supported on the bottom of said fishing bucket for containing minnows or crawfish or the like therein.

15. A fishing bucket as in claim 14, wherein a lid means is rotatably supported on the open upper end of said minnow bucket, said lid means having finger grip means therein for rotating the lid means relative to the minnow bucket, and cutout means in said lid means providing access to the interior of said minnow bucket while said lid is positioned on said minnow bucket.

16. A fishing bucket as in claim 15, wherein a container for food or beverages or the like is positioned above and is supported on the upper marginal edge of said minnow bucket, one side of said food container being recessed radially inwardly from the periphery thereof, said recess being in substantial alignment with the opening in said minnow bucket lid to provide access to the interior of said minnow bucket through said recess and through said opening in said lid while said food container is supported on said minnow bucket in said fishing bucket.

17. A fishing bucket as in claim 16, wherein said food container is crescent shaped and has a convex edge and a concave edge, said concave edge defining said recess.

18. A fishing bucket as in claim 16, wherein compartment means is on said closure means, said compartment means divided into a plurality of subcompartments for containing different fishing accessories or the like.

19. A fishing bucket as in claim 18, wherein a rotatable compartment means is connected to said means centrally of the seat and closure unit and is rotatably supported thereby beneath said combined closure unit and seat means within said fishing bucket, said compartment means comprising a tackle tray.

20. A fishing bucket as in claim 19, wherein said tackle tray is subdivided into a plurality of subcompartments for containing different fishing tackle.

21. A fishing bucket as in claim 20, wherein said seat is crescent shaped to define a cutaway portion on one side thereof, said cutaway portion providing access to said compartments on top of said bucket closure unit when said seat is rotated relative thereto.

22. A fishing bucket as in claim 21, wherein the contents of said fishing bucket are removable through the upper end thereof.

23. A fishing bucket as in claim 15, wherein a minnow trap is in said minnow bucket, said minnow trap comprising a pair of perforate, upstanding walls joined together along one edge thereof at an angle relative to one another, said minnow trap secured to the bottom of said minnow bucket.

24. A fishing bucket as in claim 23, wherein a minnow stop is in said minnow bucket, said minnow stop comprising an upstanding perforate triangular wall secured in said minnow bucket and lying in a plane bisecting the angle between the walls of said minnow trap.

* * * * *